United States Patent
Jepson et al.

[11] Patent Number: 5,837,304
[45] Date of Patent: Nov. 17, 1998

[54] OLIVE PROCESSING METHOD

[75] Inventors: Donald Jepson, Modesto; Robert Moore, Madera; Mehran Samimi; Cyrus Kashefi, both of Modesto; Michael Bodine, Merced, all of Calif.

[73] Assignee: Tri Valley Growers, Modesto, Calif.

[21] Appl. No.: 824,009

[22] Filed: Mar. 25, 1997

[51] Int. Cl.$^6$ .................................................. A23L 1/272
[52] U.S. Cl. ...................... 426/270; 426/507; 426/508; 426/615
[58] Field of Search ................................. 426/270, 615, 426/507, 508

[56] References Cited

U.S. PATENT DOCUMENTS

| 4,463,023 | 7/1984 | McCorkle et al. | 426/270 |
| 4,664,926 | 5/1987 | Scrimshire | 426/270 |

OTHER PUBLICATIONS

Fernandez, A. et al. Black Olives by alkaline oxidation, pp. 287–292 FSTA 74 (05):J0642, 1973.

Fernandez, A. Processing black olives in alkaline medium with a single lye treatment 83(05):J0668FSTA, 1981.

Brenes, M. et al. Effect of pH on the Color Formed by Fe–Phenolic Complexes in Ripe Olives, J Sci Food Agri 1995, 67, 35–41.

*Primary Examiner*—Helen Pratt
*Attorney, Agent, or Firm*—Limbach & Limbach L.L.P.

[57] ABSTRACT

Methods of debittering and coloring black ripe olives include the steps of treating the olives with iron solution at elevated temperature, in the absence of oxidizing agents, followed by the step of aerating the solution. The unique coloring method permits a relatively high concentration of lye to be used in the debittering process which precedes the coloring process, resulting in significant overall time savings for the combined processes. A three day debittering and coloring olive process is described which results in consistent, high quality product.

16 Claims, 2 Drawing Sheets

OLIVE PROCESSING METHOD

This application claims the benefit of U.S. provisional application No. 60/023,449 filed Mar. 26, 1996.

BACKGROUND OF THE INVENTION

1. Field of the Invention

This invention relates to a method for processing olives. More specifically, this method relates to a process for curing fresh and stored olives in shorter periods of time and using smaller quantities of water. Olives produced by the method are of good color, flavor and texture.

2. Description of Related Art

Traditional methods of processing olives (such as Manzanillo, Sevillano and Ascolano varieties) to obtain ripe black olives can use as much as 10,000 gallons of water per ton of olives. The series of steps will commonly use multiple treatments including alkaline solutions and rinses to obtain a quality taste and color. Shorter processing times are desirable because of labor and water savings. Smaller water quantities are desirable since water used in the curing process must be treated before it is disposed of or recycled.

Many olive process variations are known, but the application of lye solutions to the olives is common to each. The different lye solution debittering processes vary hydroxide concentration and time of application, a well as the temperature of the lye and rinse solutions. Some processes include intermediate a "dry" steps in which the solutions are drained, leaving the olives dry between the solution treatments. Since producing a uniform black color is important, some processes use ferrous gluconate containing solutions to enhance color uniformity.

Many attempts have been made to shorten overall processing time. However, the delicate balance between ensuring complete debittering, achieving proper product color, and maintaining good fruit firmness have generally caused processors to resist changes from more traditional methods. These methods are typically six to seven day processes.

Shorter methods are known. For example, U.S. Pat. No. 4,463,023 describes an olive processing method which is said to improve over traditional processes by providing shorter cure times and lower water consumption. This patent is directed to a process for olive processing using repeated 30 minute cycles, which cycles include the application of a relatively low concentration (0.45–1.2% by weight) alkaline solution. Solution temperatures of from 65°–75° F. are used for a period of about 5 minutes, after which the solution is drained and the olives are left dry for the remaining portion of a 30 minute cycle. These cycles are repeated for a "plurality" of times over a period of days (three for storage olives, five days for fresh), after which the olives are subjected to a described conventional process wherein a lye solution of 1.2–1.3% is used for 24 hours (during which carbon dioxide is bubbled through the solution) followed by a rinse and "pasteurization" at high temperature (140°–160° F. for 24 hours).

U.S. Pat. No. 4,664,929 describes an olive curing process in which supersaturated carbonic acid is circulated (and recirculated) through the olive curing solution in an effort to more efficiently neutralize the lye in the olives which have been treated, and shorten the overall curing process. The process is said to minimize the overall water usage.

While traditional processes and even newer processes such as are known from the '023 and '929 patents, can provide a high quality product, improvements which can further reduce water usage and the consistency of product quality are highly desirable. For this reason, it is an object of this invention to identify new processes for olive processing which reduce overall processing time (and water consumption) yet produce consistently high product quality.

SUMMARY OF THE INVENTION

In order to achieve this object, the invention provides a process for the production of ripe black olives comprising the steps of immersing black ripe olives (either from storage or fresh) in alkaline solution having a hydroxide concentration of at least 2.0% by weight of solution; aerating said solution while agitating said olives; replacing said alkaline solution with water; neutralizing remaining hydroxide in said olives and water; heating the water to a temperature of at least 160° F.; adding iron to said water to form an iron containing solution; soaking said olives in said iron containing solution, without aeration, for a period sufficient for said iron to penetrate surfaces of said olives; aerating said iron containing solution; and replacing said iron containing solution with rinse water.

Another form of the invention comprises a method of coloring black ripe olives which have been debittered. In this form of the invention, the steps of the process include immersing debittered black ripe olives in water; heating the water to a temperature of at least 160° F. (and preferably 180° F.); adding iron (typically ferrous gluconate) to said water to form an iron containing solution; soaking said olives in said iron containing solution, without aeration, for a period sufficient for said iron to penetrate surfaces of said olives; and aerating said iron containing solution. The method produces very consistent jet black color in the olives.

BRIEF DESCRIPTION OF THE DRAWINGS

The invention will be better understood by reference to the attached figures in which.

DESCRIPTION OF THE PREFERRED EMBODIMENT

The invention will now be described with reference to the preferred embodiment. To put the process of the invention in context, reference is first made to FIG. 1 which shows the typical steps involved in harvesting, curing and canning olives.

As can be seen, olives from the harvest are brought to the processing facility and first sized and graded and then sorted into two categories: ripe and green. Ripe olives will be used for the preparation of olive oil, and the green olives are graded and sized for canning. Black olives are over-ripe and are not suitable for canning. Instead, the oil from the black olives is extracted, and the de-oiled olive meal is generated.

During the course of the harvest, it is typically necessary to store some of the green olives while they await processing. Storage is accomplished by placing the green olives in an acidic brine solution.

Once ready for processing, the main processing step involves curing the olives to remove bitterness, and imparting the characteristic black color to the olives. The olives are immersed in a lye (sodium hydroxide) solution to remove the bittering compounds. The olives are then thoroughly rinsed of the lye solution. Ferrous gluconate is added to color the olives.

Once cured, the olives are pitted and the pitted olives are separated from the unpitted olives. This is traditionally done by floating the pitted olives in a brine solution where the unpitted olives and separated pits sink. The pitted olives are then canned in a brine solution.

Figure 1:
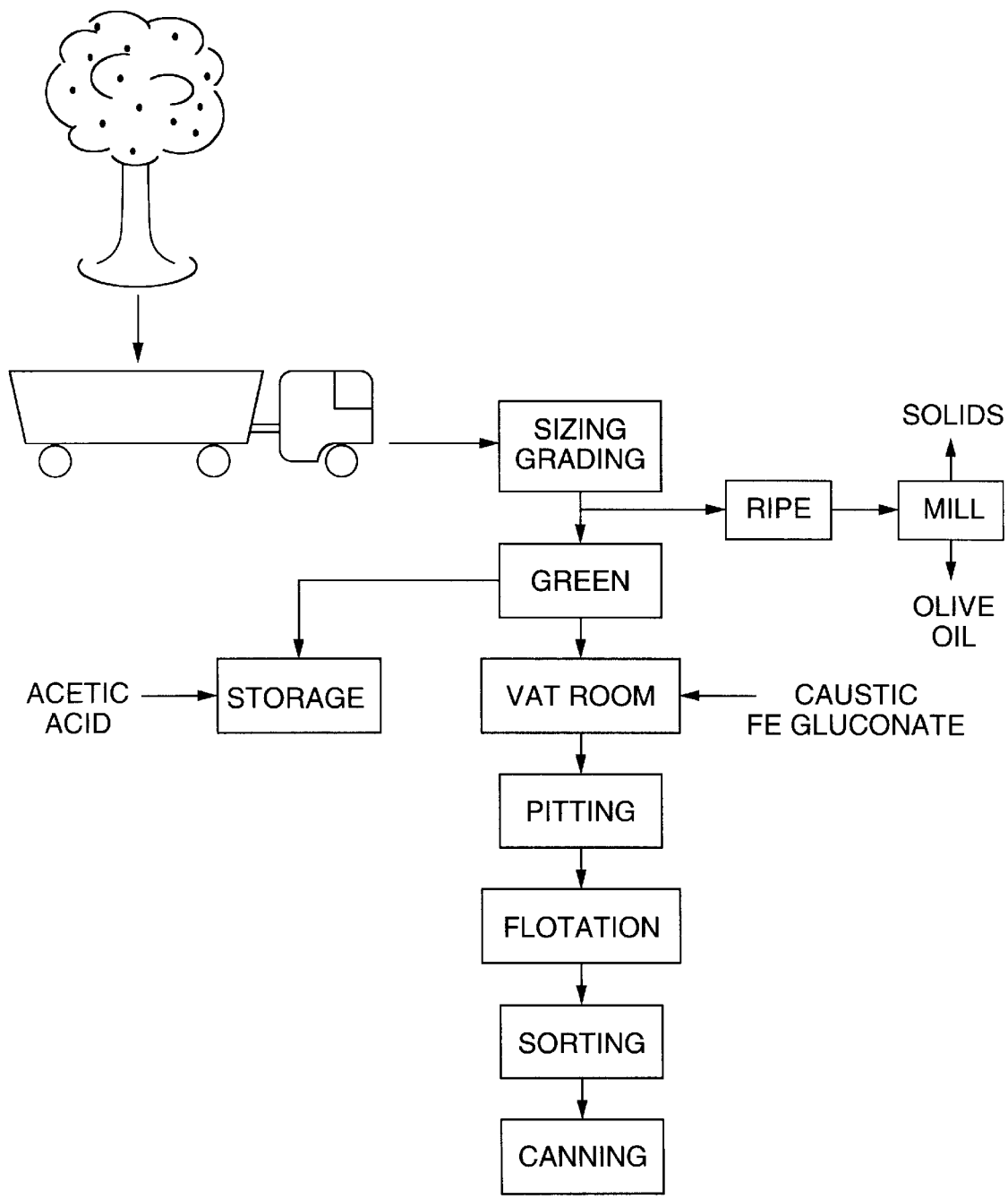
FIG. 1 is a flow chart showing the general steps of harvesting, processing and canning olives.

The present invention relates to a new method for curing the olives which takes place in the vat room of FIG. 1. One form of the method of the invention is depicted in the flow chart of FIG. 2.

To begin the process, the olives are transported to the vat room, and are rinsed. Olives are then loaded into a curing vat (from 2–9 tons, usually 8 tons per vat). Lye solution is added to the vat. As is known to olive processors, fruit temperatures should not exceed 75° F. while the olives are in the lye solution, or the fruit will be softened and/or peeled by the lye. An important aspect of the method of the invention is the use of higher concentrations of lye than are conventional. In this regard, the lye solution will range from 2.0 to 3.5% NaOH by weight of solution (as determined via titration) preferably greater than 2.5%). The amount of lye solution can generally be described as approximately 1 part lye solution to 2 part olive (by weight). This can vary but best results are generally 2:1 olive to water ratio. The lye solution and olives are aerated and agitated, for example by direct air injection, during which process the liquid portion becomes saturated with air. Those skilled in the olive processing art are familiar with the use of air agitation and aeration.

The temperature is maintained below 75° F., and the aeration step continues for from about 24 to about 36 hours until the lye penetrates partially into the pit of the olive. Penetration is measured by cutting the olive. This step debitters the olive by breaking down Europin, which is a sugar alkaloid compound. This step also forms the compounds which will be the precursors for the black color formed on the skin of the olive. The precursor is an anthocyanin compound which is oxidized to a flavanone (yellow/tan color).

The lye curing water is drained and fresh water (again, ensuring a temperature lower than 75° F.) is used to refill the vat. Carbon dioxide gas is bubbled slowly into the water, while the pH of the solution is maintained on the acidic side so as to ensure neutralization of lye residual (pH of 5.5 typical). Phenolphthalein indicator is used to determine when the olives have been neutralized, which can take from about two to about twelve hours.

After neutralization the solution is drained and the vat is refilled with rinse water. The solution is then heated to a temperature of about 160 to about 210° F., for example using a tube or plate heat exchanger. A temperature of about 180° F. is preferred. Preferably, the vat is not heated by direct steam injection due to steamline and boiler compound carryover. The solution temperature is raised gradually (preferably over at least 60 minutes) to prevent tissue damage to the olives. Importantly, this step is conducted without aeration. By "without aeration" it is meant that the solution should be maintained as free as possible from oxidants such as dissolved oxygen. Without being bound by theory, we believe that this heating step deaerates the solution and results in polymerization of anthocyanin color precursors, which are indicated by a brown color formation. The high temperature accelerates the polymerization mechanism and provides uniform distribution of the polymer throughout the surface of the olive.

Once the desired temperature is reached, iron salt is added to the solution. Food grade ferrous gluconate will typically be used, though any type of food grade ferrous salt will be acceptable (e.g. lactate or sulfate). The ferrous salt is added to the vat by sprinkling uniformly on top of the solution in a manner which minimizes agitation of the solution and therefore any additional oxidation of the components of the solution. The final concentration of ferrous gluconate should be maintained at about 0.1% by weight of the solution. In this regard, we have found that higher concentrations of the salt can result in shorter coloring times, but at the risk of off flavors in the final product, whereas lower concentrations will lengthen the color development time. Those skilled in the art understand that the most effective concentration and contact time of ferrous ion will vary depending upon the olive maturity, size and variety. Generally, ferrous salt concentration may range from 0.05% to as much as 0.2% and contact time may vary from 15 minutes up to 45 minutes, preferably 30 minutes. During this step the ferrous ion forms a complex with the anthocyanin compounds which are present in the olive.

Importantly, we have found that air contact must be greatly minimized in this step to allow the ferrous ion to complex with the organics. We have realized that the inclusion of air during this step is detrimental to the coloring process because it promotes the formation of ferric ion, which does not readily penetrate the olive surface.

Thus, the combined use of a first relatively high lye concentration treatment with aeration and agitation for debittering, followed by a non-aerated, relatively high temperature ferrous ion solution treatment forms an important part of the process of the invention.

Figure 2:
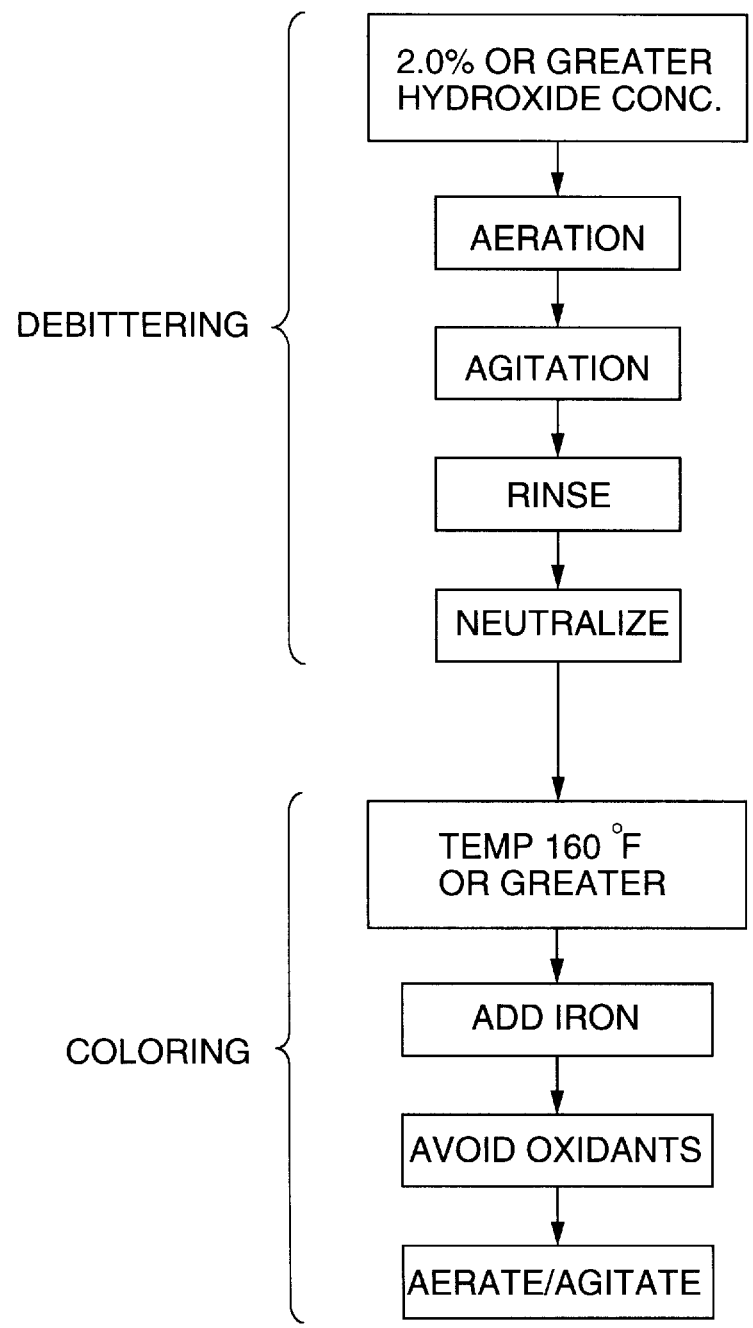
FIG. 2 is a flow chart showing the steps of a preferred embodiment of the method of the invention.

Again referring to the process as shown in FIG. 2, the ferrous ion containing solution is now aerated and agitated. Agitation of the solution can be by mechanical means. The introduction of air oxidizes the complexed ferrous to ferric ions and causes a charge transfer reaction between the iron and the organic components in the olive surface. The result is a complex which turns the olive surface jet black. The air contact time in this step is from about 5 minutes to about 60 minutes. A preferred time is thirty minutes for full color development. The optimal time is determined by simply sampling the olives and considering whether a high quality and uniformly colored olive has been achieved. When this desired color formation is apparent, the iron containing solution is drained from the vat.

In the next step of the method, the vat is filled with fresh water to cool the olives. As is common in traditional processes, calcium chloride is added to firm the olives, at a dosage rate of one gallon of 37% calcium chloride per ton of olives in the vat. This dosage may vary depending on texture and variety. The dose range is from about 0.25 gallon/ton up to about 2.0 gallons per ton. The olives are aerated in this solution for from two to about eight hours, until desired product texture is achieved.

As a last step of the curing method, the vat is drained and filled with fresh water and the olives are sent to the canning department.

Experimental

The invention will be better understood by reference to the following examples.

1. Traditional Method

A traditional method is described for comparison with the method of the invention. In this traditional method, the olives are placed in a lye solution (approximately 1%) for 12 hours. The olives are then rinsed in a solution containing a small amount of calcium chloride (560 ppm) for 16 hours.

The rinse solution is then removed and the olives are once again treated with the 1% sodium hydroxide, this time for four hours. The calcium chloride rinse is then used again for 4 hours, followed by calcium chloride containing solution, this time for 18 hours. On the third day the lye solution is again used for ten hours, followed by a calcium chloride rinse for 9 hours, then lye solution for 5 hours, rinse for 5 hours and finally a slightly stronger hydroxide solution (1.5%) for 16hours. Air is typically bubbled through the solution during the debittering process in the belief that this caused the formation of a uniformly black olive color.

Following this debittering process, an eight hour water rinse is applied, followed by the use of a solution through which carbon dioxide is bubbled for 6 hours. A ferrous gluconate solution is then used (813 ppm) for coloring the olives. An acidic solution (314 ppm HCl) is then used for 5 hours. These steps are followed by another water wash (5 hours) and the application of another ferrous gluconate acidic treatment for five hours. Finally, a last rinse of water at 120° F. is used for up to twelve hours. The olives are then canned.

This process uses about 6,000 gallons of water per ton of olives, and produces high quality product, taking between 6 and 7 days.

2. Trial 1—Two Day

An attempt was made to identify a shorter olive curing process which would take approximately two days. In this method we used 3,500 pounds of fresh olives, to which 450 gallons of a 1.5% lye solution was added, followed by aeration and agitation with air. Aeration was continued until lye penetrated to the pit, about 16 hours.

The lye solution was then drained and 450 gallons of rinse water added. The rinse solution was aerated for 1½ hours and then drained. Another 450 gallons of water was added, and $CO_2$ was bubbled through the solution for ten minutes.

Ferrous gluconate was added to the solution (twenty pounds) and the solution was retained until ⅛" color depth in the olive was achieved on black ring, approximately thirty minutes.

The solution was drained and 450 gallons of rinse water used, with aeration and agitation for eight hours. After two hours four gallons of $CaCl_2$ solution was introduced. The solution was then drained and replaced with another rinse of 450 gallons of water, with aeration. A last rinse solution was applied with aeration for four hours.

The results were unsatisfactory due to poor olive color and flavor.

3. Trial 2—Three Day

A trial was undertaken to identify a process which would be accomplished in about three days. In this test, 2000 pounds of lbs of manzanillo olives were used in 3750 lbs water (450 gallons). A higher concentration of lye was tried: 94 lbs sodium hydroxide to achieve a 2.5% lye concentration.

This solution was bubbled vigorously until the lye had penetrated all the way into the pit (approximately 4–6 hours). The lye solution was drained and 450 gallons of rinse water was used, with aeration for one and one-half hours. This rinse was then repeated two times (each time: 450 gals, bubble for 1 and ½ hours). Finally, a further rinse was applied (450 gals), but was aerated for sixteen more hours. The goal was to neutralize the olive by removing as much lye as possible. After the 16 hours of bubbling, the pH of the olives should be about 9.5.

A further rinse was applied, this time the solution was heated to 120° F., with aeration for four hours. This heated rinse was repeated.

After the heated rinse, another 450 gallon rinse is used, with aeration for 16 more hours, until pH is about 8.5.

Following this rinse step, an weak lye solution was used: 0.05% lye concentration, with aeration for one hour.

4.2 gallons gluconate solution (gluconate solution is a 50% wt/wt solution of ferrous gluconate and hydrochloric acid). pH of total solution is about 7.0. 2.25 Lbs of dry ferrous gluconate is added and the solution heated to 120° F. The solution was aerated for about two hours, then allowed to cool while bubbling an additional four hours.

The gluconate solution was drained and 450 gallon rinse was used, heated 120° F. The solution was allowed to sit for 2 hours. This rinse was then repeated. A final rinse was used to finish the curing process.

The same test was run multiple times. Results were inconsistent and the method was deemed unsatisfactory.

What is claimed is:

1. A method of coloring black ripe olives comprising the steps of:
   (a) immersing debittered black ripe olives in water;
   (b) heating the water to a temperature of at least 160° F;
   (c) while maintaining the temperature of at least 160° F., adding ferrous iron to said water to form an iron containing solution;
   (d) while maintaining the temperature of at least 160° F., soaking said olives in said iron containing solution, without aeration, for a period sufficient for said iron to penetrate surfaces of said olives; and
   (e) aerating said iron containing solution.

2. A method according to claim 1, wherein said iron is added in the form of a member selected from the group consisting of ferrous gluconate, ferrous lactate, ferrous sulphate and ferrous chloride.

3. A method according to claim 1, wherein said heating step is accomplished over a period of no less than sixty minutes.

4. A method according to claim 1, wherein said iron is added in an amount such that said iron containing solution has an iron concentration of about 0.1% by weight of said solution.

5. A method according claim 1, wherein said water is heated to a temperature of about 180° F.

6. A method according claim 1, wherein said olives are soaked for a period of from 15 minutes to 45 minutes in said iron containing solution.

7. A method according to claim 1, wherein said olives are soaked for a period of 30 minutes in said iron containing solution.

8. A method according to claim 1, wherein said aeration occurs over a period of from 5 to 60 minutes.

9. A method according to claim 1, wherein said aeration occurs over a period of about thirty minutes.

10. A method according to claim 1, further comprising the step of agitating said olives in said iron containing solution during said aerating.

11. A method according to claim 10, wherein said agitation is mechanical.

12. A method of curing black ripe olives comprising the steps of:
   (a) immersing black ripe olives in alkaline solution having a hydroxide concentration of at least 2.0% by weight of solution;
   (b) aerating said solution while agitating said olives;
   (c) replacing said alkaline solution with water;
   (d) neutralizing remaining hydroxide in said olives and water;

(e) heating the water to a temperature of at least 160° F.;
(f) adding ferrous iron to said water to form an iron containing solution, while maintaining the temperature of the water of at least 160° F.;
(g) while continuing to maintain the temperature of the water of at least 160° F., soaking said olives in said iron containing solution, without aeration, for a period sufficient for said iron to penetrate surfaces of said olives;
(h) aerating said iron containing solution; and
(i) cooling the olives by replacing said iron containing solution with rinse water.

13. A method according to claim 12 wherein said olives are immersed for a period of from 24 to 36 hours.

14. A method according to claim 12 wherein said hydroxide concentration is greater than 2.5% by weight of said solution.

15. A method according to claim 12 wherein said olives and water are neutralized over a period of from 2 to 12 hours.

16. A method of coloring black ripe olives comprising the steps of:
(a) immersing debittered black ripe olives in water;
(b) heating the water to a temperature of about 180° F.;
(c) while maintaining the temperature of about 180° F., adding ferrous iron to said water to form an iron containing solution;
(d) while maintaining the temperature of about 180° F., soaking said olives in said iron containing solution, without aeration, for a period of from 15 minutes to 45 minutes; and
(e) aerating said iron containing solution for a period of from 5 to 60 minutes.

* * * * *